US008956754B2

(12) United States Patent
Kim (10) Patent No.: US 8,956,754 B2
(45) Date of Patent: Feb. 17, 2015

(54) ELECTRODE PLATE, METHOD FOR MANUFACTURING THE ELECTRODE PLATE, AND SECONDARY BATTERY HAVING THE ELECTRODE PLATE

(75) Inventor: Jaehyung Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 133 days.

(21) Appl. No.: 13/412,931

(22) Filed: Mar. 6, 2012

(65) Prior Publication Data

US 2012/0288749 A1 Nov. 15, 2012

(30) Foreign Application Priority Data

May 11, 2011 (KR) ........................ 10-2011-0043997

(51) Int. Cl.
*H01M 4/04* (2006.01)

(52) U.S. Cl.
CPC .......... *H01M 4/0404* (2013.01); *H01M 4/0435* (2013.01)
USPC .......... 429/161; 429/211; 429/209; 29/623.5; 29/623.3

(58) Field of Classification Search
None
See application file for complete search history.

(56) References Cited

U.S. PATENT DOCUMENTS

| 6,040,086 A * | 3/2000 | Yoshida et al. ............... 429/211 |
| 6,051,338 A * | 4/2000 | Miyazaki et al. ............. 429/211 |
| 6,106,975 A * | 8/2000 | Watanabe et al. ............. 429/211 |
| 2005/0214647 A1 | 9/2005 | Tanaka et al. |
| 2008/0008934 A1* | 1/2008 | Wu ............................... 429/161 |

FOREIGN PATENT DOCUMENTS

| JP | 05-028990 A | 2/1993 |
| JP | 2004-335374 | 11/2004 |
| JP | 2005-044539 A | 2/2005 |
| JP | 2005-277064 A | 10/2005 |
| JP | 2007-273390 | 10/2007 |
| JP | 2008-226502 A | 9/2008 |
| KR | 10-0264387 B1 | 5/2000 |
| KR | 10-2009-0034737 A | 4/2009 |
| KR | 10-2009-0075393 A | 7/2009 |

OTHER PUBLICATIONS

Korean Notice of Allowance in KR 10-2011-0043997, dated Aug. 31, 2012 (Kim).

* cited by examiner

*Primary Examiner* — Milton I Cano
*Assistant Examiner* — Wojciech Haske
(74) *Attorney, Agent, or Firm* — Lee & Morse, P.C.

(57) ABSTRACT

An electrode plate of a secondary battery includes an electrode current collector, an active material coated portion on at least one surface of the electrode current collector, and an uncoated portion on the electrode current collector, the uncoated portion including pressed portions extending from a boundary of the active material coated portion and the uncoated portion to a distance on the uncoated portion in a widthwise direction of the electrode current collector.

16 Claims, 8 Drawing Sheets

ELECTRODE PLATE, METHOD FOR MANUFACTURING THE ELECTRODE PLATE, AND SECONDARY BATTERY HAVING THE ELECTRODE PLATE

This application claims foreign priority benefits to the Korean Patent Application No. 10-2011-0043997, filed on May 11, 2011, in the Korean Intellectual Property Office, and entitled: "Electrode Plate, Method for Manufacturing the Electrode Plate, and Secondary Battery having the Electrode Plate," which is incorporated by reference herein in its entirety.

BACKGROUND

1. Field

Embodiments relate to an electrode plate, a method for manufacturing the electrode plate, and a secondary battery having the same.

2. Description of the Related Art

Generally, a secondary battery is formed by inserting an electrode assembly, including a positive electrode plate, a negative electrode plate, and a separator wound together, into a case and sealing the electrode assembly with a cap assembly. Each of the positive electrode plate and the negative electrode plate (to be referred to as an 'electrode plate' hereinafter) includes an active material coated portion with an active material slurry coated on, e.g., an aluminum or copper, thin film and an uncoated portion without the active material slurry.

The electrode plate, i.e., the active material coated portion, is subjected to rolling to have an increased adhesiveness with respect to an electrode current collector and to increase the capacity density. The rolled electrode plate is dried and is cut into a predetermined size using a cutter having a predetermined width to then be used.

SUMMARY

Embodiments are directed to an electrode plate having pressed portions formed on a boundary surface between an active material coated portion and an uncoated portion by pressing a current collector coated with an active material using a stepped part pressing jig.

Embodiments are also directed to a method for manufacturing an electrode plate having a stepped part formed at a boundary surface between active material coated and uncoated portions of an electrode current collector, the electrode plate having pressed portions formed in one direction on the boundary surface between the active material coated and uncoated portions by pressing the current collector coated with an active material using a stepped part pressing jig.

Embodiments are also directed to a secondary battery having improved performance by providing an electrode assembly including an electrode plate having pressed portions formed on a boundary surface between an active material coated portion and an uncoated portion by pressing a current collector coated with an active material using a stepped part pressing jig.

At least one of the above and other features and advantages may be realized by providing an electrode plate of a secondary battery, the electrode plate including an electrode current collector, an active material coated portion on at least one surface of the electrode current collector, and an uncoated portion on the electrode current collector, the uncoated portion including pressed portions extending from a boundary of the active material coated portion and the uncoated portion to a distance on the uncoated portion in a widthwise direction of the electrode current collector.

The pressed portions may include a plurality of consecutive creases inclined in one direction.

The creases may be at an angle in a range of about 10° to about 50° with respect to the boundary of the active material coated portion and the uncoated portion, the creases being inclined in an opposite direction to a direction in which the electrode current collector is supplied.

The creases may have widths in a range of about 4 mm to about 10 mm, the widths being measured from the boundary of the active material coated portion and the uncoated portion to edges of the creases along a normal to the boundary.

Intervals between adjacent creases may be in a range of about 1.3 mm/EA to about 1.7 mm/EA.

The creases may have a thickness of about 152 μm or less with respect to the at least one surface of the electrode current collector.

The electrode current collector may include aluminum metal foil.

The pressed portions may contact the active material coated portion.

The active material coated portion may be between two pressed portions, each pressed portion extends along an entire length of the active material coated portion.

Each pressed portion may include a plurality of creases at acute angles and spaced apart from each other.

Adjacent creases may have different angles and widths, each crease having an angle of about 10° to about 50° and a width of about 4 mm to about 10 mm.

The pressed portions may be shorter than the uncoated portions in a widthwise direction of the electrode current collector, as measured along a normal to the boundary of the active material coated portion and the uncoated portion.

The pressed portions may be formed in the distance of about 10 mm.

At least one of the above and other features and advantages may be realized by providing method for manufacturing an electrode plate, the method including supplying an electrode current collector by a guide roll, mixing an active material with a conductive material to form an active material slurry to be coated on the electrode current collector, coating the active material slurry on at least one surface of the electrode current collector, such that an active material coated portion and an uncoated portion are defined on the electrode current collector, pressing the coated electrode current collector using a stepped part pressing jig, such that pressed portions are formed to extend from a boundary of the active material coated portion and the uncoated portion to a distance of about 10 mm on the uncoated portion in a widthwise direction of the electrode current collector, and drying the pressed electrode current collector.

Pressing using the stepped part jig may include using a jig having an active material pressing portion corresponding to the active material coated portion of the electrode current collector, an uncoated portion pressing portion corresponding to the uncoated portion of the electrode current collector, and a stepped part formed between the active material pressing portion and the uncoated portion pressing portion and corresponding to a coating thickness of the active material slurry.

Pressing using the stepped part jig may include using a jig having flat surfaces that overlap both the active material coated portion and the uncoated portion, such that both the active material coated portion and the uncoated portion of the electrode plate are pressed.

At least one of the above and other features and advantages may be realized by providing a secondary battery, including an electrode assembly having electrode plates of different polarities and a separator therebetween, each electrode plate including an electrode current collector, an active material coated portion on at least one surface of the electrode current collector, and an uncoated portion on the electrode current collector, the uncoated portion including pressed portions extending from a boundary of the active material coated portion and the uncoated portion to a distance of about 10 mm on the uncoated portion in a widthwise direction of the electrode current collector, an electrode assembly storing unit configured to store the electrode assembly, and a cap assembly sealing the electrode assembly storing unit.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element, e.g., a layer, is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 3:
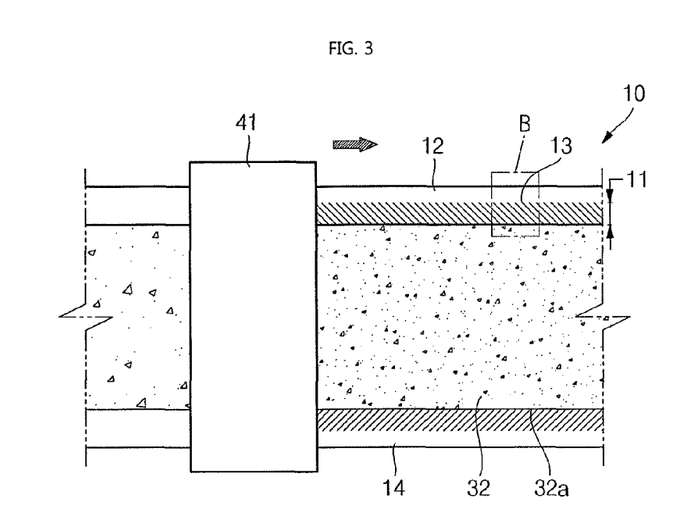
FIG. 3 illustrates a schematic diagram of pressed portions in an electrode plate according to an embodiment.
Figure 4A:
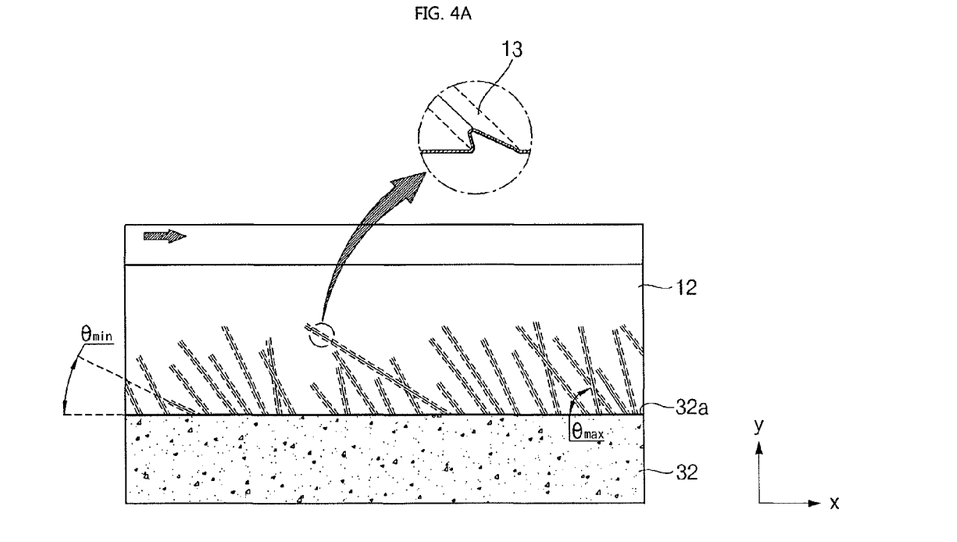
FIG. 4A illustrates an enlarged plan view of portion "B" in FIG. 3, which illustrates angles of creases in pressed portions according to an embodiment.
Figure 4B:
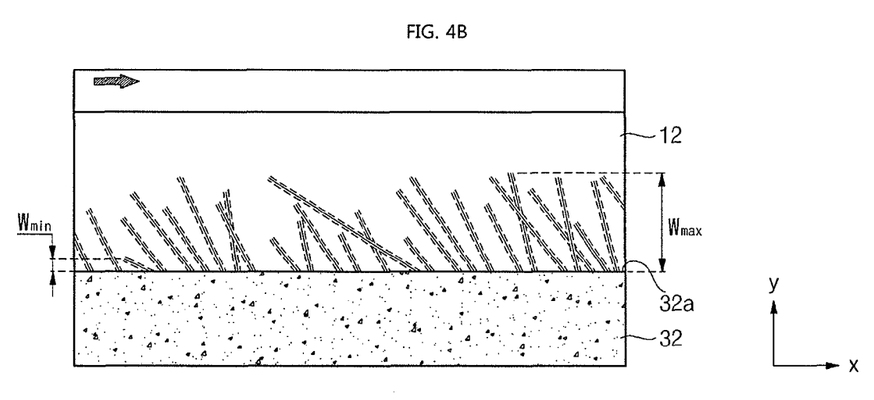
FIG. 4B illustrates an enlarged plan view of portion "B" in FIG. 3, which illustrates widths of creases in pressed portions according to an embodiment.
Figure 4C:
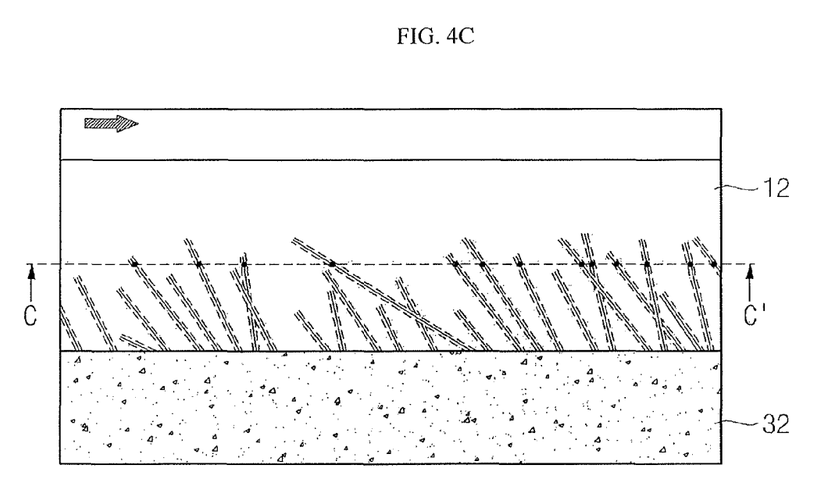
FIG. 4C illustrates an enlarged plan view of portion "B" in FIG. 3, which illustrates intervals of creases in pressed portions according to an embodiment.
Figure 4D:
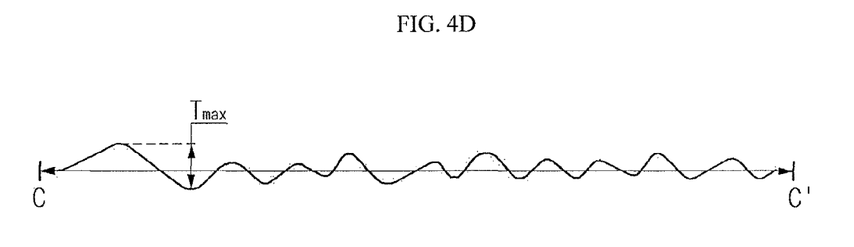
FIG. 4D illustrates a cross-sectional view of a thickness of a pressed portion, taken along line C-C' of FIG. 4C.

Hereinafter, an electrode plate according to an embodiment will be described with reference to FIGS. 3 and 4A-4D. FIG. 3 is a schematic diagram of an unwound electrode plate according to an embodiment, FIGS. 4A-4C are enlarged plan views of portion "B" in FIG. 3 illustrating angles, width, and intervals, respectively, of creases in an electrode plate according to an embodiment, and FIG. 4D is a cross-sectional view illustrating a thickness of a pressed portion along line C-C' of FIG. 4C.

Referring to FIG. 3, an electrode plate 10 according to an embodiment may include pressed portions 11 formed, e.g., uniformly, in one direction at a boundary surface, i.e., a boundary 32a, between an active material coated portion 32 and each uncoated portion 12 and 14. The pressed portions 11 may be formed by pressing the electrode plate 10 using a stepped part pressing jig 40, i.e., a jig having a stepped part formed to correspond to a coated portion of an electrode current collector and an uncoated portion thereof.

The electrode plate 10 may be formed as a positive electrode plate or a negative electrode plate having different polarities. The electrode plate 10 may be formed, e.g., of an aluminum metal foil. The positive electrode plate includes a positive electrode current collector, a positive electrode active material coated portion having an active material coated on at least one surface of the positive electrode current collector, and an uncoated portion not coated with the active material. The negative electrode plate includes a negative electrode current collector, a negative electrode active material coated portion having an active material coated on at least one surface of the negative electrode current collector, and an uncoated portion not coated with the active material.

The pressed portions 11 may be formed in a boundary region between the active material coated portion 32 and each of the uncoated portions 12 and 14, e.g., in a 10 mm region of each of the uncoated portions 12 and 14 adjacent to the active material coated portion 32. In other words, as illustrated in FIG. 3, a pressed portion 11 may extend in each of the uncoated portions 12 and 14, e.g., directly, from the active material coated portion 32 in a widthwise direction of the electrode plate. The pressed portion 11 may include a plurality of consecutively formed creases 13. In the following description, the pressed portions 11 according to an embodiment will be described with regard to the creases 13.

Referring to FIG. 4A, the creases 13 may be formed in the boundary surface of the active material coated portion 32 and each of the uncoated portions 12 and 14 at predetermined angles θ, e.g., at an angle in a range of about 10° ($\theta_{min}$) to about 50° ($\theta_{max}$), in a direction in which the electrode current collector is supplied. For example, the creases 13 may have different angles θ, e.g., each two adjacent creases 13 may or may not have a same angle θ. As illustrated in FIG. 4A, the predetermined angle θ is measured with respect to a lengthwise direction, i.e., the x-axis, of the electrode current collector, e.g., an angle of 90° may be defined by an imaginary line (not shown) across a width of the electrode current collector from the boundary surface of the active material coated portion 32 and each of the uncoated portions 12 and 14.

Referring to FIG. 4B, the creases 13 may be formed at the boundary surface of the active material coated portion 32 and each of the uncoated portions 12 and 14 to have predetermined widths W, e.g., a width in a range of about 4 mm ($W_{min}$) to about 10 mm ($W_{max}$). For example, the creases 13 may have different widths W, e.g., each two adjacent creases 13 may or may not have a same width W. As illustrated in FIG. 4B, the predetermined width W is measured between the active material coated portion 32 and an outermost edge of a corresponding crease 13 along a widthwise direction, i.e., along the y-axis, of the electrode current collector. That is, the width W is measured along a normal to a boundary 32a of the active material coated portion 32. The creases 13 may be consecutively formed, and each of the creases 13 may be formed at intervals ranging from about 1.3 mm/EA to about 1.7 mm/EA, e.g., an interval between each two adjacent, i.e., consecutive, creases 13 along the x-axis may be about 1.3 mm to about 1.7 mm. For example, 15 to 20 creases 13 may be formed in a region about 26.5 mm long along the x-axis, i.e., in a direction in which the electrode current collector 10 is supplied, as shown in FIG. 4C.

Referring to FIG. 4D, a thickness, e.g., depth, of each of the creases 13 may be about 152 μm or less in view of an imaginary line C-C', as shown in FIGS. 4C and 4D. As the creases 13 are formed by pressing the uncoated portions 12 and 14 with the stepped part pressing jig 40, the creases 13 may be formed to have a predetermined thickness, i.e., a maximum thickness of about 152 μm and a minimum thickness of about 0 μm, due to the pressed portions formed on surfaces of the uncoated portions 12 and 14. That is, the creases 13 may be formed to have various thicknesses in a range of about 0 μm to about 152 μm.

Figure 1:
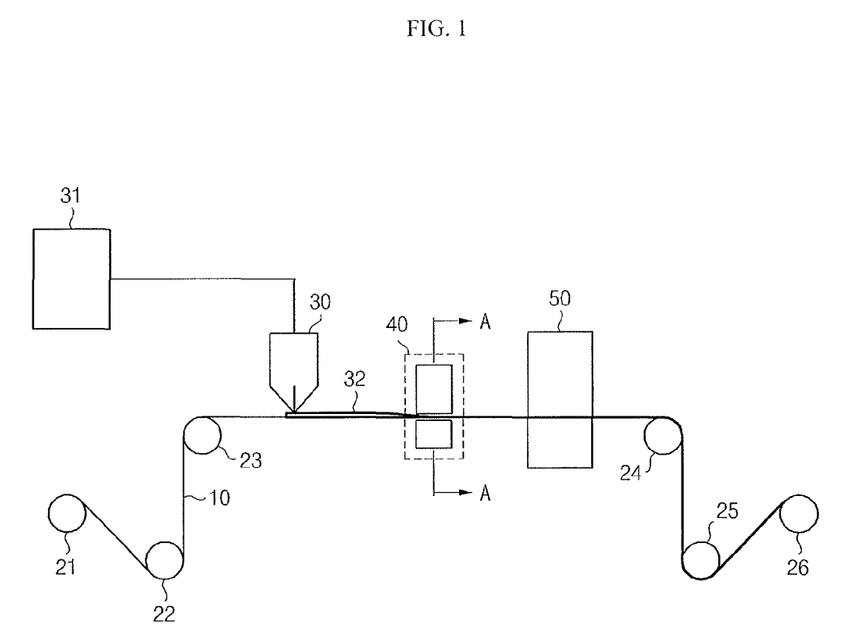
FIG. 1 illustrates a schematic diagram of a manufacturing process of an electrode plate according to an embodiment.
Figure 2:
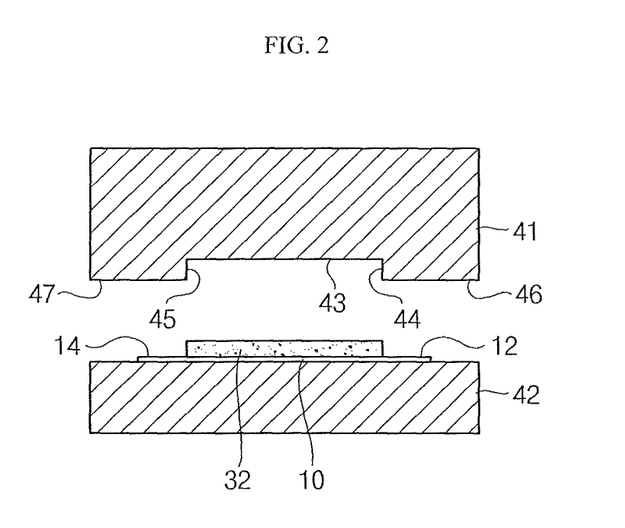
FIG. 2 illustrates a cross-sectional view of a pressing step in the manufacturing process of an electrode plate shown in FIG. 1.

A method for manufacturing an electrode plate according to the embodiment of will be described hereinafter with reference to FIGS. 1-2 and 6. FIG. 1 is a schematic diagram of a manufacturing process of an electrode plate according to an embodiment, FIG. 2 is a cross-sectional view of a pressing step in the manufacturing process of FIG. 1, and FIG. 6 is a flow chart of a method of manufacturing an electrode plate according to an embodiment.

Figure 6:
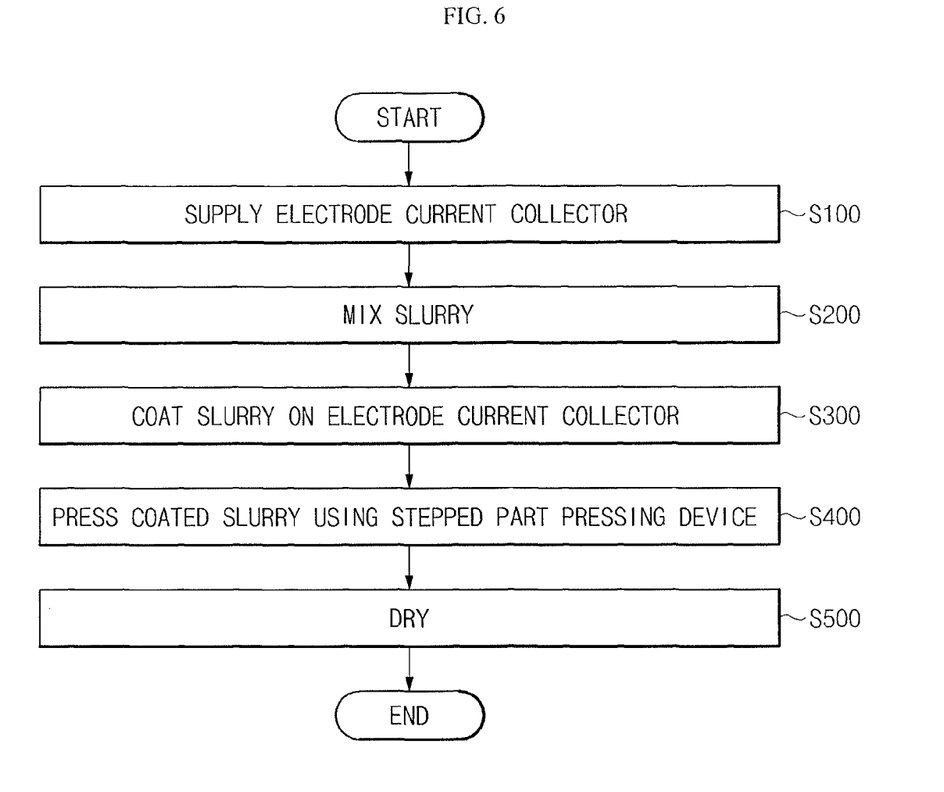
FIG. 6 illustrates a flow chart of a method of manufacturing an electrode plate according to an embodiment.

Referring to FIG. 6, a method of manufacturing an electrode plate according to an embodiment may include supplying an electrode current collector (S100), mixing an active material to form a slurry composition (S200), coating the active material, i.e., slurry, on the electrode current collector (S300), pressing the coated electrode current collector (S400), and drying the pressed electrode collector (S500). In the manufacturing method of the electrode plate, pressed portions having a stepped part corresponding to a coated portion and an uncoated portion of the electrode current collector may be formed uniformly in one direction by pressing the boundary surface between the active material coated portion 32 and each of the uncoated portions 12 and 14 using a stepped part pressing jig 40 (FIG. 2), as will be described in more detail below.

During supplying of the electrode current collector (S100), a positive electrode current collector or a negative electrode current collector formed of a conductive metal foil (to be referred to as an 'electrode current collector 10' hereinafter) may be supplied. The electrode current collector 10 may be formed of a metal foil, e.g., an aluminum foil. The electrode current collector 10 may be supplied from a winding roll 21 through a plurality of guide rolls 22, 23, 24, 25, and 26 (FIG. 1) with constant tension.

During mixing of the active material (S200), the positive or negative electrode active material (to be referred to as an 'electrode active material' hereinafter) and a conductive material are mixed with a binder solution in an active material storing unit 31 to form an active material slurry to then be stored (FIG. 1).

A chalcogenide compound may be used as a positive electrode active material in the active material. Examples of the chalcogenide compound may include composite metal oxides, e.g., $LiCoO_2$, $LiMn_2O_4$, $LiNiO_2$, $LiNi_{1-x}Co_xO_2$ (0<x<1), or $LiMnO_2$. Alternatively, examples of the positive electrode active material may include NCM-based positive electrode active materials, e.g., $Li[NiCoMn]O_2$, NCA-based positive electrode active materials, e.g., $Li[NiAlCo]O_2$, or LFP-based positive electrode active materials, e.g., $LiFePO_4$.

Examples of the negative electrode active material may include lithium metal, a metallic material capable of mixing with lithium to form a lithium alloy, a transition metal oxide, a lithium dopable/undopable material, a material irreversibly reacting with lithium to form a compound, or a material capable of reversibly intercalating/deintercalating lithium ion. Examples of the metallic material capable of mixing with lithium to form a lithium alloy may include one or more of Na, K, Rb, Cs, Fr, Be, Mg, Ca, Sr, Ba, Ra, Ti, Ag, Zn, Cd, Al, Ga, In, Si, Ge, Sn, Pb, Sb, Bi and combinations thereof. Examples of the transition metal oxide, the lithium dopable/undopable material, and the material irreversibly reacting with lithium to form a compound may include vanadium oxide, lithium vanadium oxide, Si, $SiO_x$ (0<x<2), Si containing metal alloy, Sn, $SnO_2$, composite tin alloys, and so on. However, example embodiments do not limit materials of the positive electrode active material and the negative electrode active material to those listed herein.

During coating of the active material (S300), the active material slurry from the storing unit 31 may be coated on at least one surface of the electrode current collector 10 to a constant thickness. Here, the active material coated portion 32 may be formed on one surface or both surfaces of the electrode current collector 10. During coating of the active material (S300), the active material may be coated on the electrode current collector 10 vertically through a slot die 30. The slot die 30 is an exemplary device of coating the active material on the electrode current collector 10, but example embodiments do not limit the coating device to the slot die 30.

In detail, coating of the active material (S300) may include coating the active material by setting a weight of the active material coated on a unit area of the electrode current collector 10. When the weight of the active material coated on a unit area of the electrode current collector 10 is set, the thickness of the active material coated portion 32 may be determined after pressing. As the active material is coated on the electrode current collector 10, the coated area of the electrode current collector 10 is defined as the active material coated portion 32, while uncoated edges of the electrode current collector 10 are defined as uncoated portions 12 and 14.

During pressing (S400), the pressing is performed using the stepped part pressing jig 40 to increase adhesion between the active material coated portion 32 and the electrode current collector plate 10. The pressing (S400) is performed to achieve a predetermined thickness of the active material coated portion 32, as set during the coating of the active material (S300).

As illustrated in FIGS. 1-2, the stepped part pressing jig 40 may be used when the active material is coated on one surface of the electrode current collector plate 10. The stepped part pressing jig 40 may include upper and lower pressing jigs 41 and 42, while the upper pressing jig 41 may include stepped parts 44 and 45 corresponding to the active material coated portion 32. If the active material is coated on both surfaces of the electrode current collector plate 10, upper and lower pressing jigs 41 and 42 with respective upper and lower stepped portions may be used. Example embodiments will be described with regard to an active material coated on one surface of the electrode current collector plate 10.

The stepped part pressing jig 40 may include the upper pressing jig 41 and the lower pressing jig 42. The stepped part pressing jig 40 may be shaped as a roll.

The upper pressing jig 41 may have the stepped parts 44 and 45 corresponding to a thickness difference between the active material coated portion 32 and the uncoated portions 12 and 14. The upper pressing jig 41 may include an active material pressing portion 43 and uncoated portion pressing portions 46 and 47. The active material pressing portion 43 corresponds to, e.g., overlaps, the active material coated portion 32 of the electrode current collector 10. The uncoated portion pressing portions 46 and 47 correspond to, e.g., overlap, the uncoated portions 12 and 14 of the electrode current collector 10, respectively. Each of the stepped parts 44 and 45 between the active material pressing portion 43 and a respective uncoated portion pressing portion 46 and 47, i.e., flat surfaces substantially perpendicular to the active material pressing portion 43, equals a thickness of the active material pressed. Since the electrode current collector 10 moves, i.e., along the arrow in FIG. 3, while the uncoated portion pressing portions 46 and 47 press the uncoated portions 12 and 14, the pressed portions 11 are produced.

In other words, the electrode current collector 10 coated with the active material passes through the stepped part pressing jig 40, forming the pressed portions 11 in the uncoated portions 12 and 14. The pressed portions 11 are formed uniformly in one direction on the boundary surface between the active material coated portion 32 and each of the uncoated portions 12 and 14. The pressed portions 11 may have a plurality of creases 13 consecutively formed, as discussed previously with reference to FIGS. 3 and 4A-4D.

The creases 13 may be formed to be inclined in a same direction, i.e., in a direction opposite the arrow in FIG. 3. The creases 13 may be formed on the boundary surfaces between the active material coated portion 32 and each of the uncoated portions 12 and 14 at an angle of about 50° ($\theta_{max}$) or less, e.g., the creases 13 may be formed at an angle in a range of about 10° ($\theta_{min}$) to about 50° ($\theta_{max}$).

In addition, the pressed portions may be formed in the vicinity of the boundary surface of the active material coated portion 32 and each of the uncoated portions 12 and 14. The creases 13 may be formed to have a maximum thickness of 152 μm. The creases 13 may be formed to have various widths in a range of about 4 mm ($W_{min}$) to about 10 mm ($W_{max}$) on the boundary surface between the active material coated portion 32 and each of the uncoated portions 12 and 14. In addition, the creases 13 may be formed at an interval of about 1.3 mm to about 1.7 mm therebetween.

Further, the creases 13 may be formed to have a section thickness of 152 μm or less. The creases 13 may have pressed portions formed by pressing the uncoated portions 12 and 14 using the upper pressing jig 41. In this case, the creases 13 may have a maximum thickness of about 152 μm and a minimum thickness of about 0 μm. The creases 13 having a thickness of 0 μm may mean that there is no crease, i.e., pressed portions 11 having regions with a thickness of 0 μm refer to regions without the creases 13, e.g., regions between two creases.

Figure 5:
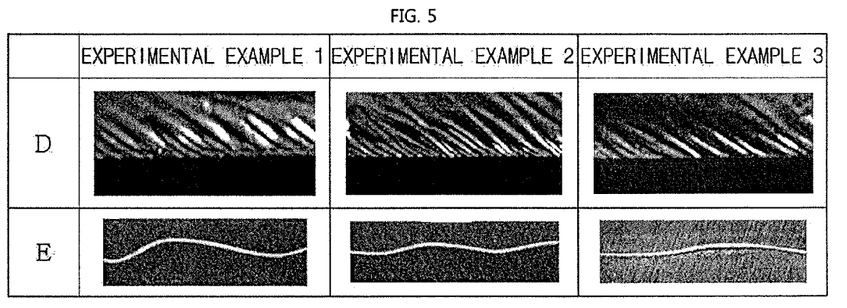
FIG. 5 illustrates enlarged views D of pressed portions and sectional views E of creases, which are formed in a pressing step shown in FIG. 2 according to Experimental Examples 1 to 3.

Next, exemplary embodiments of electrode plates pressed by the stepped part pressing jig 40 in the pressing (S400) will be described with reference to FIG. 5. FIG. 5 illustrates enlarged views D of pressed portions and cross-sectional views E of creases in Experimental Examples 1 to 3, which were performed in a pressing step shown in FIG. 2 according to a design of each electrode plate. It is noted that data set in Experimental Examples 1 to 3 is based on the battery characteristics, but example embodiments are not limited thereto.

In the following Experimental Examples 1 to 3, an electrode current collector coated with an active material was pressed using a stepped part pressing jig shown in FIG. 2, i.e., a stepped part pressing jig including an upper pressing jig and a lower pressing jig. The stepped part pressing jig was used to press the electrode current collector with the active material at a speed of 11 m/min, and aluminum metal foil was used as the electrode current collector. Pressed portions with a plurality of creases were formed on the electrode current collector. It is noted that example embodiments are not limited to the speed and materials used in Experimental Examples 1 to 3.

Experimental Example 1

A positive electrode active material was made by mixing nickel-cobalt-manganese material, i.e., $LiNi_{0.5}Co_{0.2}Mn_{0.3}O_2$ (V3+NCM 523), a binder, and an additive at a ratio of 90:5:5, followed by coating the positive electrode active material on an electrode current collector to a thickness of about 280 μm. A weight of the positive electrode active material coated on a unit area ($cm^2$) of the electrode current collector was set to 50.00 mg/$cm^2$, followed by pressing until a positive electrode active material layer having a thickness of 208 μm and a mixed density of 2.65 (g/cc) was formed. As shown in FIG. 2, when the positive electrode active material layer was pressed by the stepped part pressing jig, pressed portions were formed on a boundary surface between the active material coated portion and each of the uncoated portions.

As shown in the enlarged views D of FIG. 5, the pressed portions included a plurality of creases formed uniformly in one direction. The creases were formed at an angle in a range of about 10.5° to about 49.6° from the boundary surface of the active material coated portion and each of the uncoated portions in view of a direction in which the electrode current collector was supplied. In addition, the creases were formed to have widths in a range of about 4 mm to about 10 mm from the boundary surface of the active material coated portion and each of the uncoated portions. When the uncoated portions were formed to be 26.5 mm long (in a lengthwise direction of the electrode plate), 16 to 17 creases were formed at intervals in a range of 1.56 mm/EA to 1.65 mm/EA. The maximum thickness of the creases was 153.1 μm.

Experimental Example 2

A positive electrode active material was prepared by mixing $LCO(LiCoO_2)/NCA(LiNi_{0.80}Co_{0.15}Al_{0.05}O_2)$ in a mixing ratio 6:4, a binder, and an additive in a ratio of 94:3:3, followed by coating the positive electrode active material on an electrode current collector to a thickness of 107 μm. A weight of the positive electrode active material coated on a unit area ($cm^2$) of the electrode current collector was set to 18.24 mg/$cm^2$, followed by pressing until a positive electrode active material layer was formed to have a thickness of 79 μm and a mixed density of 3.09 (g/cc).

As shown in the enlarged views D of FIG. 5, the formed pressed portions of the electrode current collector included a plurality of creases at an angle in a range of 22.4° to 40.7° at the boundary surface of the active material coated portion and each of the uncoated portions in view of a direction in which the electrode current collector was supplied. In addition, the creases were formed to have widths in a range of 5 mm to 10 mm from the boundary surface of the active material coated portion toward each of the uncoated portions. When the uncoated portions were formed to have a length of 26.5 mm, 18 to 19 creases were formed at intervals in a range of 1.39 mm/EA to 1.47 mm/EA. The maximum thickness of the creases was 80.7 μm.

Experimental Example 3

A negative electrode active material was formed by mixing $LTO(Li_4Ti_5O_{12})$, a binder, and an additive mixed in a ratio of 89:6:6, followed by coating the negative electrode active material on an electrode current collector to a thickness of 195 μm. A weight of the negative electrode active material coated on a unit area (cm$^2$) of the electrode current collector was set to 17.36 mg/cm$^2$, followed by pressing to form a negative electrode active material layer having a thickness of 111 μm and a mixed density of 1.91 (g/cc).

As shown in the enlarged views D of FIG. 5, the pressed portions of the resultant negative electrode active material layer included a plurality of creases formed uniformly in one direction. The creases were formed at an angle in a range of 22.4° to 40.7° from the boundary surface of the active material coated portion and each of the uncoated portions in view of a direction in which the electrode current collector was supplied. In addition, the creases were formed to have widths in a range of 4 to 7 mm from the boundary surface of the active material coated portion and each of the uncoated. When the uncoated portions were formed as long as 24 mm, 16 creases were formed at intervals of about 1.5 mm/EA. The maximum thickness of the creases was 86.9 μm.

According to results of Experimental Examples 1 to 3, during pressing (S400), the stepped parts of the stepped part pressing jig, e.g., corresponding to stepped parts 44 and 45 in FIG. 2, were adjusted to have a same length as a thickness of the active material coated portion, thereby forming the creases in the uncoated portions. As a result, the creases were formed on the boundary surface of the active material coated portion and each of the uncoated portions. Since the creases were formed within the ranges of angle, widths, and cycles, as shown from the results of Experimental Examples 1 to 3, a defect, e.g., cutting of the uncoated portion, may be avoided. In other words, the pressed portions may make the uncoated portion clearly and visibly distinguished from the active material coated portion, so only the uncoated portion may be cut. In addition, as confirmed from the results of Experimental Examples 1 to 3, production efficiency may be improved in the manufacture of the electrode plate, while reducing material loss. In addition, since high-quality electrode plate is manufactured, the performance of the secondary battery may also be improved.

Referring back to FIGS. 1 and 6, during the drying (S500), the pressed electrode current collector 10 may be dried in a vacuum chamber 50. The vacuum chamber 50 may remove a solvent and moisture from the active material 32.

Figure 7:
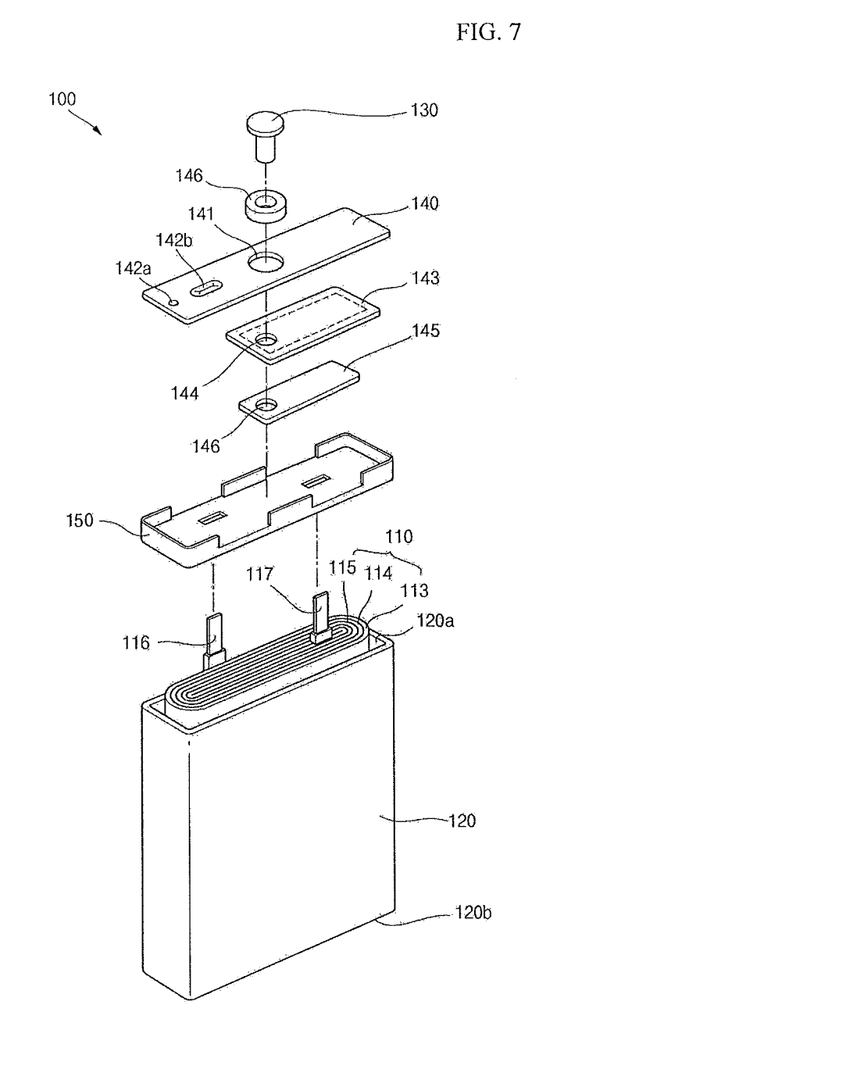
FIG. 7 illustrates an exploded perspective view of a secondary battery including electrode plates according to an embodiment.

Next, a secondary battery 100 according to an embodiment will be described with reference to FIG. 7. FIG. 7 is an exploded perspective view of a secondary battery according to an embodiment. It is noted that while FIG. 7 illustrates a secondary battery of a prismatic type by way of example, example embodiments are not limited thereto and various types of secondary batteries, e.g., a pouch type, may also be applied to example embodiments.

Referring to FIG. 7, a secondary battery 100 may include an electrode assembly 110, a can 120, an electrode terminal 130, and a cap plate 140.

The electrode assembly 110 may include electrode plates having different polarities and a separator 114. The electrode plates include a positive electrode plate 113 and a negative electrode plate 115. The positive electrode plate 113 may be coated with a positive electrode active material, and the negative electrode plate 115 may be coated with a negative electrode active material. The positive electrode plate 113 may have a positive electrode tab 117 connected to an uncoated portion thereof, and the negative electrode plate 115 may have a negative electrode tab 116 connected to an uncoated portion thereof. In addition, the positive electrode tab 117 may be electrically connected to the electrode terminal 130.

An electrode plate will now be described with regard to either the positive electrode plate 113 or the negative electrode plate 115. An uncoated portion may be formed in each of the positive electrode plate 113 and the negative electrode plate 115, and the uncoated portion may include pressed portions. In this case, the pressed portions may be formed in both the positive electrode plate 113 and the negative electrode plate 115 or in either the positive electrode plate 113 or the negative electrode plate 115. Since the pressed portions formed in the positive electrode plate 113 and the negative electrode plate 115 have the same shapes and functions, the following description will refer to the positive electrode plate 113. The positive electrode plate 113 may be formed in the processes described with reference to FIGS. 1-2 and 6. Referring to FIGS. 3 and 7, the positive electrode plate 113 may include the active material coated portion 32 and the uncoated portions 12 and 14 formed on at least one surface of the electrode current collector 10. In addition, the pressed portions 11 may be formed uniformly in one direction on the boundary surface of the active material coated portion 32 and each of the uncoated portions 12 and 14. The pressed portions may include the plurality of consecutive creases 13.

The creases 13 may be formed at an angle in a range of about 10° ($\theta_{min}$) to about 50° ($\theta_{max}$) from the boundary surface of the active material coated portion and the uncoated portion. In addition, the creases 13 may be formed to have widths in a range of about 4 mm ($W_{min}$) to about 10 mm ($W_{max}$) from the boundary surface of the active material coated portion and the uncoated portion. The plurality of the consecutive creases 13 may be formed at intervals in a range of about 1.3 mm/EA to about 1.7 mm/EA. The creases 13 may have the pressed portions formed by pressing the uncoated portions 12 and 14 using the stepped part pressing jig 40. The creases 13 may be formed to have a maximum thickness of about 152 μm. In addition, since pressed portions are formed on surfaces of the uncoated portions, the creases 13 may have a minimum thickness of about 0 μm. That is to say, the creases 13 may have various thicknesses in a range of about 0 μm to about 152 μm.

Since the electrode assembly includes the creases 13 with pressed portions formed uniformly in one direction on the uncoated portion of the positive electrode plate 113, the performance of the secondary battery 100 may be improved.

The can 120 may be formed of a metallic material, e.g., aluminum or an aluminum alloy, using deep drawing. A bottom surface 120b of the can 120 may be substantially planar. The can 120 may serve as a terminal itself. The can 120 may have an open top portion, forming a top opening 120a. The electrode assembly 110 may be received in the can 120 through the top opening 120a.

The cap plate 140 may be coupled to a separate insulation case 150 to then be coupled to the top opening 120a of the can 120, thereby sealing the can 120. A through-hole 141 may be formed in the cap plate 140 to allow the electrode terminal 130 to be inserted thereinto. A gasket 146 may be formed between the through-hole 141 and the electrode terminal 130 to seal a gas therebetween. In addition, the cap plate 140 may include an electrolyte injection hole (not shown), a plug 142a, and a safety vent 142b.

In addition, the cap plate 140 may include an insulation plate 143 and a terminal plate 145 formed at its lower portion. The insulation plate 143 has a first terminal hole 144 located corresponding to the through-hole 141 of the cap plate 140. The insulation plate 143 is made of an insulating material like the gasket 146.

The terminal plate 145 may be mounted on a bottom surface of the insulation plate 143. The terminal plate 145 may be made, e.g., of a nickel alloy. The terminal plate 145 has a second terminal hole 146 located corresponding to the first terminal hole 144. The electrode terminal 130 penetrates the through-hole 141 and the first and second terminal holes 144 and 146 and is then coupled to the terminal plate 145, and the positive electrode tab 117 is connected to one side of the terminal plate 145. In addition, the negative electrode tab 115 may be connected to a bottom surface of the cap plate 140. The negative electrode tab 115 is connected to the cap plate 140 by, for example, welding. Examples of the welding may include resistance welding and laser welding. Resistance welding may generally be used.

As described above, in an electrode plate according to embodiments, since pressed portions are formed uniformly in one direction on a boundary between an active material coated portion and an uncoated portion, e.g., the pressed portions may be shorter and more visible than conventional uncoated portions having no pressed portions, a defect, such as cutting of the uncoated portion, may be avoided. In addition, a secondary battery having an electrode assembly with electrode plates according to embodiments may have improved performance.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An electrode plate of a secondary battery, the electrode plate comprising:
    an electrode current collector;
    an active material coated portion on at least one surface of the electrode current collector; and
    an uncoated portion on the electrode current collector, the uncoated portion including pressed portions extending from a boundary of the active material coated portion and the uncoated portion to a distance on the uncoated portion in a widthwise direction of the electrode current collector,
    wherein the pressed portions include a plurality of creases extending from the boundary of the active material coated portion and the uncoated portion, and
    wherein the plurality of creases are shorter than the uncoated portions in a widthwise direction of the electrode current collector, as measured along a normal to the boundary of the active material coated portion and the uncoated portion.

2. The electrode plate as claimed in claim 1, wherein the plurality of creases are inclined in one direction.

3. The electrode plate as claimed in claim 2 wherein the plurality of creases are at an angle in a range of about 10° to about 50° with respect to the boundary of the active material coated portion and the uncoated portion.

4. The electrode plate as claimed in claim 2, wherein the plurality of creases have widths in a range of about 4 mm to about 10 mm, the widths being measured from the boundary of the active material coated portion and the uncoated portion to edges of the plurality of creases along a normal to the boundary.

5. The electrode plate as claimed in claim 2 wherein intervals between adjacent creases are in a range of about 1.3 mm/EA to about 1.7 mm/EA.

6. The electrode plate as claimed in claim 2, wherein the plurality of creases have a thickness of about 152 μm or less with respect to the at least one surface of the electrode current collector.

7. The electrode plate as claimed in claim 1, wherein the electrode current collector includes aluminum metal foil.

8. The electrode plate as claimed in claim 1, wherein the pressed portions contact the active material coated portion.

9. The electrode plate as claimed in claim 1, wherein the active material coated portion is between two pressed portions, each pressed portion extends along an entire length of the active material coated portion.

10. The electrode plate as claimed in claim 9, wherein each pressed portion includes a plurality of creases at acute angles and spaced apart from each other.

11. The electrode plate as claimed in claim 9, wherein adjacent creases have different angles and widths, each crease having an angle of about 10° to about 50° and a width of about 4 mm to about 10 mm.

12. The electrode plate as claimed in claim 1, wherein the pressed portions are formed in the distance of about 10 mm.

13. A method for manufacturing an electrode plate, the method comprising:
    supplying an electrode current collector by a guide roll;
    mixing an active material with a conductive material to form an active material slurry to be coated on the electrode current collector;
    coating the active material slurry on at least one surface of the electrode current collector, such that an active material coated portion and an uncoated portion are defined on the electrode current collector;
    pressing the coated electrode current collector using a stepped part pressing jig, such that pressed portions are formed to extend from a boundary of the active material coated portion and the uncoated portion to a distance of about 10 mm on the uncoated portion in a widthwise direction of the electrode current collector; and
    drying the pressed electrode current collector,
    wherein the pressed portions include a plurality of creases extending from the boundary of the active material coated portion and the uncoated portion, and
    wherein the plurality of creases are shorter than the uncoated portions in a widthwise direction of the electrode current collector, as measured along a normal to the boundary of the active material coated portion and the uncoated portion.

14. The method as claimed in claim 13, wherein pressing using the stepped part jig includes using a jig having an active material pressing portion corresponding to the active material coated portion of the electrode current collector, an uncoated portion pressing portion corresponding to the uncoated portion of the electrode current collector, and a stepped part formed between the active material pressing portion and the uncoated portion pressing portion and corresponding to a coating thickness of the active material slurry.

15. The method as claimed in claim 13, wherein pressing using the stepped part jig includes using a jig having flat surfaces that overlap both the active material coated portion and the uncoated portion, such that both the active material coated portion and the uncoated portion of the electrode plate are pressed.

16. A secondary battery, comprising:
    an electrode assembly having electrode plates of different polarities and a separator therebetween, each electrode plate including:
    an electrode current collector, an active material coated portion on at least one surface of the electrode current collector, and an uncoated portion on the electrode current collector, the uncoated portion including pressed portions extending from a boundary of the active material coated portion and the uncoated portion to a distance of about 10 mm on the uncoated portion in a widthwise direction of the electrode current collector, wherein the pressed portions include a plurality of creases extending from the boundary of the active material coated portion and the uncoated portion, and wherein the plurality of creases are shorter than the uncoated portions in a widthwise direction of the electrode current collector, as measured along a normal to the boundary of the active material coated portion and the uncoated portion;

an electrode assembly storing unit configured to store the electrode assembly; and a cap assembly sealing the electrode assembly storing unit.

* * * * *